July 17, 1956  R. B. COSTELLO  2,755,367
APPARATUS FOR FIELD WELDING SEAMS IN VERTICAL PLATE
Filed March 17, 1954  3 Sheets-Sheet 1

INVENTOR
R. B. COSTELLO
BY J. H. Palmer
U. J. Davico
ATTORNEYS

July 17, 1956 R. B. COSTELLO 2,755,367
APPARATUS FOR FIELD WELDING SEAMS IN VERTICAL PLATE
Filed March 17, 1954 3 Sheets-Sheet 2
FIG. 2
FIG. 4
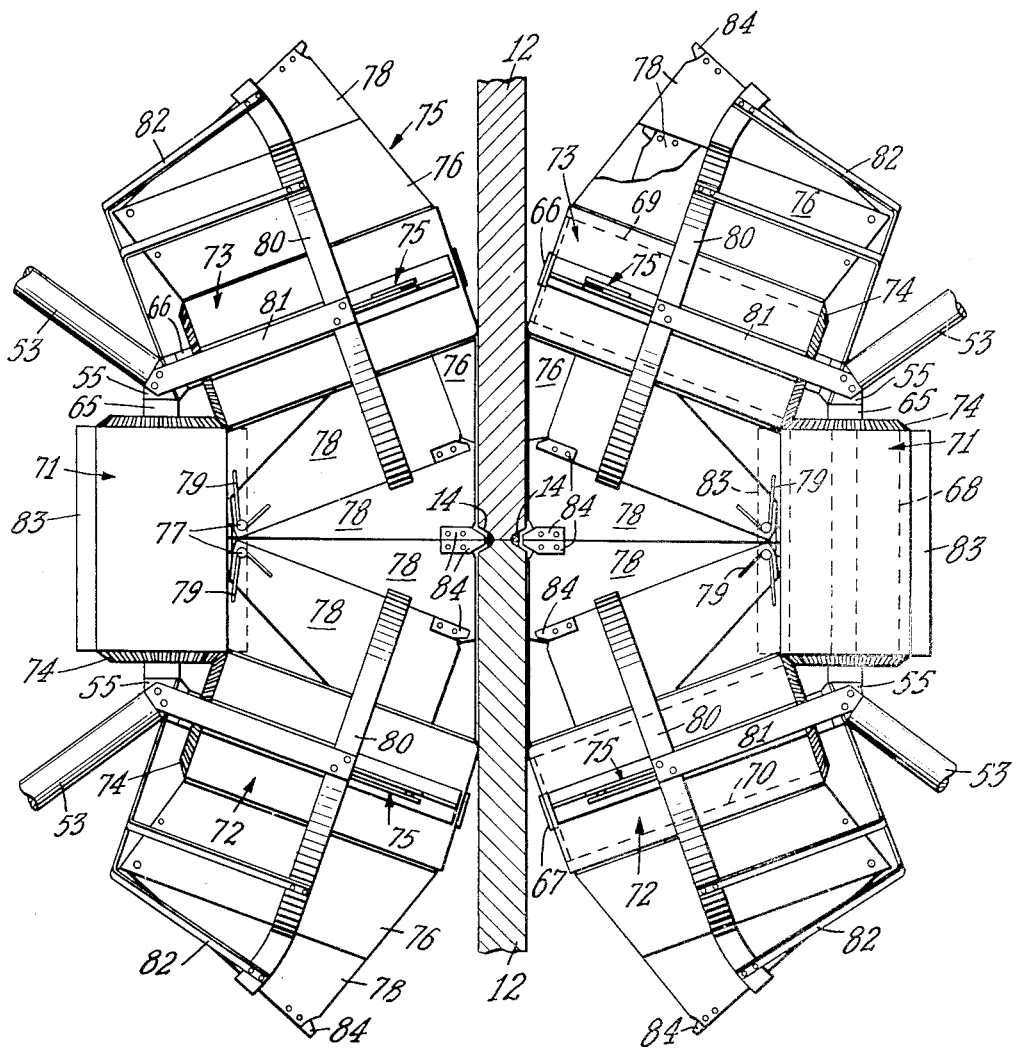
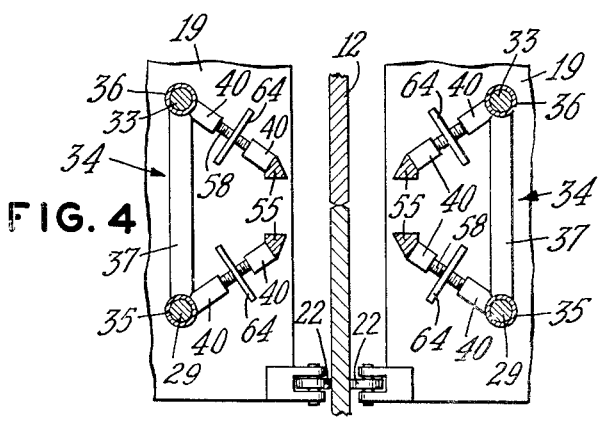
INVENTOR
R. B. COSTELLO
BY *G. H. Palmer*
*U. F. Davis*
ATTORNEYS July 17, 1956 R. B. COSTELLO 2,755,367
APPARATUS FOR FIELD WELDING SEAMS IN VERTICAL PLATE
Filed March 17, 1954 3 Sheets-Sheet 3

INVENTOR
R. B. COSTELLO
BY
S. H. Palmer
U. J. Davies
ATTORNEYS

United States Patent Office 2,755,367
Patented July 17, 1956

2,755,367

APPARATUS FOR FIELD WELDING SEAMS IN VERTICAL PLATE

Robert B. Costello, Rahway, N. J., assignor to The M. W. Kellogg Company, Jersey City, N. J., a corporation of Delaware Application March 17, 1954, Serial No. 416,918

17 Claims. (Cl. 219—8)

This invention relates to field welding of tank shells formed of vertical plates joined together by continuous seam welds and more particularly to simple, practical apparatus for automatically welding the vertical seams of such tank shells by flux submerged arc welding.

The advantages which follow the use of automatic flux submerged arc welding in place of hand welding with coated electrodes in the field welding of tanks were quickly appreciated as flux submerged arc welding techniques became available. However, automatic flux submerged arc welding has not heretofore come into wide use in the field welding of tanks because of the difficulties it presents. Thus, for successful use of the flux submerged arc welding techniques, it is essential that a proper bed of flux be provided at the seam to be welded and that such flux be maintained substantially immovable relative to the seam during the weld metal deposition and for a period thereafter at least sufficient for solidification of the weld metal. If motion of the flux bed occurs prior to the solidification of the weld metal, the weld metal will at best be defective, usually it will be dragged out at the seam. In the field welding of tank shells, the constituent plates are assembled in the vertical position so that the vertical seams must be welded with the plates vertical. This involves the provision of a vertical column of flux which covers the seam laterally and permits the deposition of weld metal therein. Various expedients for accomplishing this end have been proposed but none of them has been especially satisfactory. The proposed expedients are too complicated for continuous efficient operation under field conditions and are generally so expensive as to offer little if any advantage over conventional hand welding.

I have found a simple and effective way of completely solving the problem so that the vertical seams in the vertical plate of the tank shell may be welded without any difficulty and without employing complicated and expensive apparatus or special preparation of the plate defining the seam.

In accordance with my invention, I provide a vertical flux retaining trough made up of a plurality of interconnected movable endless belts. The straight runs of two of the belts are maintained against the plates on either side of the seam, sufficient pressure being applied so that the friction between the straight runs of the belts and the surface of the plates engaged thereby prohibit relative motion therebetween. The belts are supported for movement on rollers carried by a frame which is moved along the seam at a controlled rate equal to the rate of electrode traverse so as to maintain a fixed positional relation between the trough and the discharge end of the electrode. The upper belt rollers and the lower belt rollers are sufficiently spaced apart to provide a trough of length ample for complete solidification of the deposited metal before flux removal therefrom. In order to provide a bottom for the trough so as to retain the flux therein while yet permitting the electrode nozzle to move through the flux and the electrode wire to reach the seam, spaced automatically operating doors are carried along the endless belts. A guide mechanism restrains the doors from closing until the welding nozzle has progressed through the flux pile and the deposited weld metal has cooled below the point of fusion. Each door as it is closed provides another bottom for the trough. The arrangement is such that at least two closed trap doors are always below the arc so as to insure against leakage of flux through the system. The doors are attached to and move with the endless belts, consequently they are in the closed position, motionless relative to the plates and the seam being welded. Thus, the flux is held stationary until a door reaches the bottom of the belts where it is permitted to open to dump the flux into a scoop which returns it to the flux circulating system.

It is a principal object of this invention to provide simple, rugged and inexpensive apparatus useful in the automatic flux submerged arc welding of vertical seams between vertically positioned members which provides a proper flux bed that laterally covers said seams and remains in position relative to the deposited weld metal during the deposition and solidification of said weld metal.

It is also a principal object of this invention to provide apparatus useful in the automatic flux submerged arc welding of vertical seams between vertically disposed members which produces a column of flux laterally covering the seam, said column being of limited length but at least sufficient to cover the weld metal during the deposition and solidification thereof, said column being continuously elongated at one end and shortened at the other end to progress said column vertically along the seam without movement thereof relative to the vertically disposed members defining the seam.

It is also a principal object of this invention to provide an apparatus useful in the automatic flux submerged arc welding of vertical seams between vertically disposed members which includes a flux trough of limited length vertically movable along the seam to maintain a column of flux laterally covering the seam and the weld metal during the deposition and solidification of the weld metal, said trough being made up of a plurality of endless belts movable at a rate to compensate for the vertical movement of the trough thus to maintain the portion of said belts continguous to said vertical members immovable relative thereto, said belts provided with a plurality of spaced platforming members to provide a series of bottoms for said trough.

The further features and advantages of the invention will become apparent from the consideration of the following detailed description of a preferred embodiment thereof taken with the accompanying drawings in which:

Fig. 2 is a plan view partly in section taken on lines 2—2 of Fig. 1;

Fig. 4 is a view similar to Fig. 2 but with parts removed to better show construction details.

Figure 1:
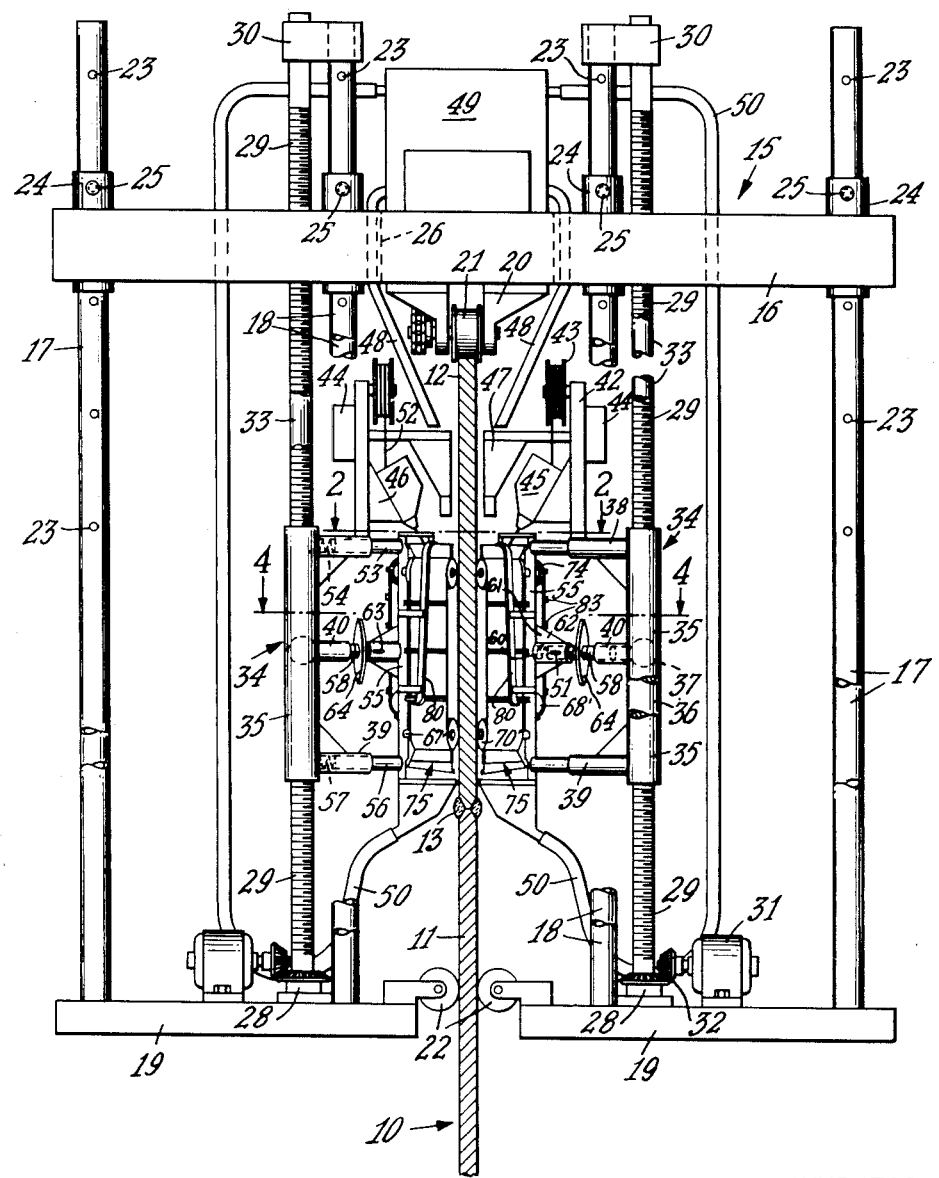
Fig. 1 is an end view partly in section showing the novel apparatus of the invention applied to the welding of both sides of a seam in vertically disposed plate.

Flux submerged arc welding is employed in connection with this invention. This mode of welding is particularly suited to field welding of large tanks such as the raw material, intermediate product and final product storage tanks found in the tank farms of petroleum refineries, as it provides for rapid deposit of high quality weld metal at a cost much lower than possible with hand welding. Flux submerged arc welding involves the supplying of a bare metal welding electrode in the form of an endless wire for fusion in an arc at a rate controlled to substantially maintain an electric current discharge of predetermined voltage and amperage while the arc end of the electrode is maintained submerged beneath a deep blanket of granular flux. The flux blanket is maintained of a depth and length sufficient to protect the weld metal during fusion and solidification thereof. Flux submerged arc welding will not be described in greater detail herein as it is so well known in the art as to be considered conventional. The specific apparatus elements for flux submerged arc welding shown in the several figures of the drawing for supplying and feeding the wire electrode, for supplying and controlling the welding current, and for supplying the flux, form no part of the present invention. Such specific apparatus elements are well known in the art and will not be described in detail herein.

The novel apparatus is shown arranged to simultaneously deposit metal on both sides of a vertical seam. This mode of operation is at present preferred as it is cheaper and more efficient since a single traverse of the apparatus along the seam will deposit a weld bead on both sides of the joint. Nevertheless, it is within the scope of this invention to modify the apparatus so that only one side of the seam is welded at one time. As shown, the two electrode discharge ends are substantially in the same horizontal plane. This is illustrative only. The arcs may be vertically spaced as required or preferred in a chosen mode of operation.

The novel apparatus is shown in connection with the field erection and fabrication of the tank shell 10. The shell 10 as is usual, is generally cylindrical and made up of a plurality of superimposed tiers of plates 11 and 12 that are joined together by appropriate welds, as for instance, the horizontal weld 13. As is common in connection with the field fabrication of large tanks such as the raw material, intermediate product and final product storage tanks of the tank farms of petroleum refineries, flat plates are brought to the site and in the assembly operations, are rigged into position by well known arrangements to the curvature required. The apparatus of the invention is shown as mounted in position on the top edge of the upper tier of plates 12. The novel apparatus of the invention is employed in welding the vertical seams 14 between the abutting vertical edges of the component plates of the plate tiers by means of flux submerged arc welding.

The novel apparatus is carried by a yoke-like structure 15 which includes an upper transverse member 16 and the platform supporting members 17 and 18. The platform supporting members 17 and 18 are united to and carry the platforms 19. While two spaced pairs of supporting members 17 and 18 for each platform 19 are shown, it is to be understood that as many of such spaced pairs are employed as are required to give the platforms 19 the necessary stability. Also, the transverse member 16 may be a single elongated member or as preferred, it may be made up of two or more beam-like members whose middle portions are connected by a longitudinal member 26, as shown. The member 16 has attached to the bottom thereof, a structure 20 which mounts one or more wheels 21. The wheel, or wheels, 21 bear on the top edge of the plates 12 and facilitate the movement of the supporting structure 15 from one to another of the vertical seams 14. Each of the platforms 19 includes a plurality of spacing wheels 22 attached thereto which are adapted to bear against the plates 11, or the plates 12, to maintain a predetermined spacing between the platforms 19 and the plates 11, or the plates 12.

In order to accommodate vertical seams 14 of different lengths, the platform supporting members 17 and 18 are so made and so connected to the upper transverse member 16 that their lengths may be adjusted within rather wide limits. For this purpose the upper ends of the platform supporting members 17 and 18 are provided with a series of spaced transverse holes 23 and the transverse member 16 is provided with bearing sleeves 24, through which the supporting members 17 and 18 pass, whose enlarged upper ends each includes a transverse hole. The holes of the supporting members 17 and 18 at the selected level are made to register with the holes of the respective sleeves 24. These elements are fastened in position by the pins 25 which are driven into the aligned holes.

Since the apparatus elements and the arrangement thereof on each side of the plates 11 and 12 are identical, only one set of such elements and the arrangement thereof will be described. Fixed to the platform 19 adjacent the platform supporting members 18 and spaced laterally therefrom, is a thrust bearing member 28 which mounts the lower end of the screw 29 for rotation therein. The upper end of the screw 29 is maintained in position by a bearing piece 30 carried at the upper end of one or both of the platform supporting members 18. The screw 29 is driven in either direction of rotation by the variable speed motor 31 through a beveled gear train 32. Control arrangements, not shown, are provided for controlling the speed of the motor 31. A frame guide member 33 is disposed parallel to the screw 29. The guide member 33 is preferably tubular and has its lower end attached to the platform 19 while its upper end is mounted in the bearing piece 30. The screw 29 and the guide member 33 are so disposed as to be in a plane substantially parallel to the plane of the seam 14. An H-shaped frame 34 is mounted on the screw 29 and the guide member 33 with the branch 35 carried by the screw 29 and the branch 36 carried by the guide member 33. The branch 35 is internally threaded for at least a portion thereof so that by the rotation of the screw 29, the frame 34 may be raised or lowered as desired. The branch 36 of the H frame 34 includes a plain straight bore through which the guide member 33 passes to guide the frame 34 in its vertical movements. The branches 35 and 36 are united by one or more horizontal connecting members 37, one only being shown.

At the upper end of each of the branches 35 and 36 is attached integrally thereto a tubular supporting member 38. A similar tubular supporting member 39 is integrally attached to the other end of each of the branches 35 and 36. Intermediate the end of each of the branches 35 and 36 is also integrally united the tubular supporting member 40. The strength and rigidity of the frame structure 34 is increased by uniting suitable corner web members to the tubular supporting members 38 and 39 and their respective ends of the branches 35 and 36 of the frame member 34. The upper tubular supporting members 38 have united thereto a vertical supporting member 42 upon which is mounted the welding wire reel 43 and the control box 44 of the welding head 45. The welding head 45 is carried on a plate web 46 attached to the vertical supporting member 42. The flux hopper 47 is also carried by the vertical supporting member 42 through a structural member united thereto. The flux hopper 47 receives granular flux through the tube 48 which extends from the flux supply box 49 which is for convenience mounted on the longitudinal member 26 and includes the usual arrangements for withdrawing granular flux from a lower level through a tube 50 and supplying it to the hopper 47 through the tube 48. The welding electrode wire 52 passes from the reel 43 to the welding head 45 wherefrom it is driven through a suitable directing nozzle to the seam 14 at a rate controlled to obtain the desired melting rate at the preestablished arc characteristics.

Each upper tubular supporting member 38 houses one end of a pressure applying supporting rod 53. A spring 54 is positioned between the housed end of each rod 53 and the end of the bore of its respective supporting member 38 to bias the respective rod 53 toward the plates that define the vertical seam 14 to be welded. The springs 53 are chosen of the scale required by the desired biasing force. The other ends of the rods 53 are united to the vertical frame members 55. Each of the lower tubular supporting members 39 houses one end of a pressure applying supporting rod 56. A spring 57 is also positioned between each of the rods 56 and the end of the respective housing bore. The other ends of the rods 56 are integrally united to the bottom of the frame member 55. The middle tubular supporting members 40 are internally threaded and each houses the threaded end of the pressure applying rod 58. The other end of each of the rods 58 is unthreaded and is housed in a tubular member 60 which is united to the frame member 55, corner reinforcements 61 being provided to strengthen the structure. A spring 62 is provided between the end of each of the rods 58 and the end of the respective bore of its respective tubular member 60. Each tubular member 60 includes a slot 63 which limits the movement of a pin 51 carried by the respective rod 58. Each of the rods 58 carries a hand wheel 64 united thereto through which the respective rod 58 may be screwed into or out of its respective supporting member 40.

Adjacent the upper end of each of the frame members 55 is mounted one end of the axles 65, 66, and 67 which, respectively, support the rollers 68, 69 and 70 for free rotation. The rollers 68, 69 and 70 in turn respectively mount the endless belts 71, 72 and 73. To provide for unisonal movement of the belts 71, 72 and 73, the peripheries of the rollers 68, 69, and 70 are provided with interconnecting series of gear teeth 74. The lower support rollers 68', 69' and 70' for the belt 71, 72 and 73 are mounted on axles 65', 66' and 67' fastened adjacent the lower end of the frame members 55.

Figure 3:
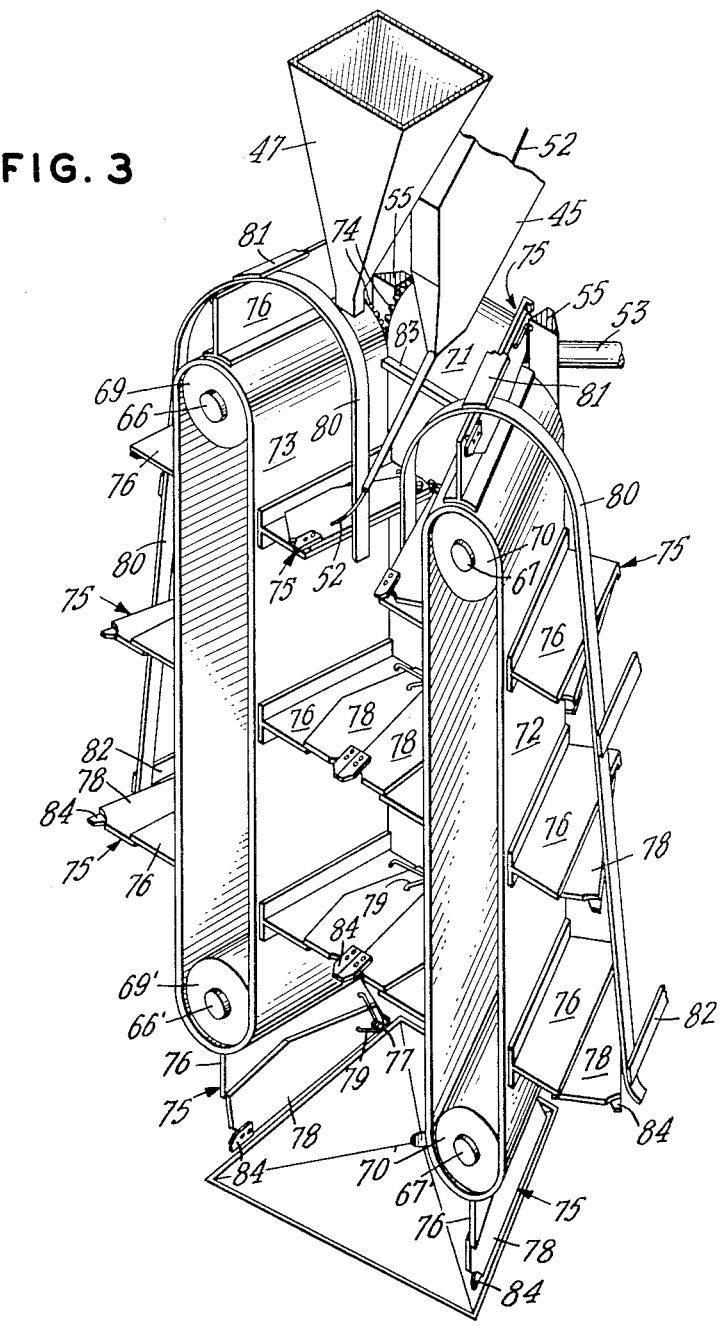
Fig. 3 is an isometric view for better illustrating the manner of operating the apparatus of the invention.

As best shown in Figs. 2 and 3, the belts 71, 72 and 73 are relatively disposed to define an open-ended flux trough therebetween. It is to be noted that the contiguous edges of the belts 71 and 72 as well as the contiguous edges of the belts 71 and 73 are closely juxtaposed to form joints of sufficient tightness to prevent the movement of flux material out of said trough. For this purpose also, said contiguous belt edges may be overlapped as much as the relative angular disposition of said belts will permit. By proper adjustment of the hand wheel 64 the frame members 55 are brought to such proximity relative to the surface of the plates defining the seam 14 that the edges of the straight runs of the belts 72 and 73 proximate said surface, bear snugly against said surface, and prevent movement of flux through the joints therebetween. The springs 54, 57 and 62 are so chosen that the bearing pressure exerted thereby is sufficient to maintain said edges of the straight run of the belts 72 and 73 immobile relative to the plate surface they engage when the frame 34 is moved vertically. The rollers 69 and 70 and 69' and 70' have their peripheries adjacent the plate surface rounded to permit substantial edge zones, rather than just the edges, of the respective belts 72 and 73 to contact the plate surface.

To provide a bottom for the flux trough so as to maintain an immobile flux column in position relative to the weld metal deposited in the seam 14 during the deposition and solidification thereof, the belts 72 and 73 have attached thereto a series of spaced door elements 75. The belts 72 and 73 and the door elements 75 thereon are so arranged that the door elements 75 occur as opposed aligned pairs in their movement through the flux trough. A sufficient number of door elements 75 are included in each series thereof to provide at least two closed doors below the arcing end of the electrode wire 52. Each door element 75 includes a section 76 of T cross section. The top web of the section 76 is united to the respective belt 72 or 73 so as to maintain the central web of the section 76 normal to the respective belt in a straight run thereof. The door element section 76 carries a pivot pin 77 affixed thereto which mounts the door section 78 for pivotal movement thereon. As best shown in Fig. 2, the door section 78 may swing on the pivot pin 77 from the fully extended position to the fully retracted position, and vice versa. A spring 79 is fastened to the door element sections 76 and 78 so as to constantly urge the section 78 toward the fully extended position.

To move the door element section 76 from the fully extended position to the fully retracted position, the guide ways 80 are provided. A guide way 80 is carried by each frame member 55 through the support members 81 and 82 attached thereto. Each guide way 80 includes a long, substantially straight leg disposed externally of the flux trough, a short leg disposed internally of the flux trough and a semi-circular run connecting said legs and overlying the supporting roller of the respective belt 72 or 73. The spacing of the guide way 80 from its respective belt 72 or 73 is such that the door element 75 may enter the space between the lower end of the long leg of guide way 80 and said respective belt, with its section 78 fully extended outwardly and as said door element 75 moves upwardly, the slope of the long leg of the guide way 80 being such that it gradually moves said section 78 to the full retracted position. When said door element 75 is in said circular run and said short leg, the spacing is such as to maintain said section 78 fully retracted. At the end of the short leg of the guide way 80 said section 78 is released for movement to the fully extended outward position. The endless belt 71 is provided with a plurality of spaced transverse tamping cleats 83. The door element sections 78 are each provided with a closure element 84 of pliant, heat resisting material, such as asbestos cloth, attached thereto. The element 84 includes a triangular extension which is adapted to fit into the empty seam 14, or over the seam 14 when it is filled with weld metal to prevent the downward movement of the granular flux material. The closure elements 84 will deform to closely engage the sides of the seam, or the face of the deposited weld metal to provide a flux tight joint. The corner of the element 78 covered by the closure element 84 is cut away so that it will not engage the weld metal and thus prevent the full extension of the element 78.

In welding a vertical seam 14 and after the novel apparatus has been properly positioned relative to said vertical seam 14 with the frames 34 lowered to such an extent that the discharge end of the welding wire electrodes 52 are at or slightly below the lower end of said seam 14, the various controls are set to provide arc discharges of predetermined characteristics and arc transverse at the desired rate. The flow of flux from the hoppers 47 into the upper end of the flux troughs formed by the belts 71, 72 and 73 is then begun and when sufficient flux has entered the troughs to fill the portions thereof between the uppermost of the closed juxtaposed pairs of door elements 75 and some predetermined level above the discharge ends of the electrode wires 52, the motors 31 are set in motion and the arc discharge from the end of the wire electrodes 52 begun. As the frames 34 move upwardly to carry the discharge ends of the electrode wires 52 upward along the seam 14 to deposit weld metal therein, the belts 72 and 73 maintain the inner straight runs thereof immobile relative to the surfaces of the plates defining the seam 14 with which their edges are in contact. The belts 71, because of the teeth 74, can move only with the belts 72 and 73 and thus will also maintain their inside straight runs immobile relative to said surfaces. Hence, the flux once it enters the flux troughs will remain fixed relative to the seam 14 and the metal deposited therein. As the upward movement of the frames 34 continues, a cleat 83 will eventually enter each of the flux troughs and engage the flux therein to exert a tamping action thereon. Also, as the upward movement of the frames 34 continues, a pair of opposed door elements 75 will reach the end of the short legs of each set of guide ways 80 so that the elements 78 will snap towards each other to provide closed flux supporting platforms which prevent the downward movement of the flux thereon. Also as the upward movement of the frames 34 continues, a pair of closed door elements 75 in each flux trough will eventually reach the level of the bottom rollers 69' and 70' of the belts 72 and 73. Further movement of the frames 34 will result in a separation of these pairs of door elements 75 to provide passageways for the movement of the flux previously supported thereby to the flux scoops therebeneath and from thence to be returned to the flux box 49 through the flux tubes 50. Further upward movement of the frames 34 will ultimately carry the thus opened pairs of door elements 75 to the lower end of the long straight runs of the guide ways 80 to be thereby acted upon to return the elements 78 thereof to the full retracted position. When the arc discharge ends of the welding wires 52 reach the upper end of the vertical seam 14, the supply of welding current and the feed of the wires as well as the feed of the flux is discontinued. The variable speed motors 31 are then reversed to return the frames 34 to the level at which the welding was begun. If it is desired to deposit a second bead in each side of the seam 14, the operation described is repeated. The operation has been described with the simultaneous initiation of the current discharge from the welding wires 52 and with the discharged ends of said welding wires 52 maintained at substantially the same level, but it is to be understood that the invention is not limited to such operation. If desired, the arc discharges while simultaneous, may be maintained at different levels. Also if required or desired, the weld metal may be deposited in one side only of the seam 14, or alternately one or more beads of weld metal may be deposited in one side of the seam 14 before weld metal is deposited in the other side of the seam 14.

While the invention has been described with particular reference to a specific embodiment, it is to be understood that it is not to be limted thereto, but is to be construed broadly and restricted by the scope of the appended claims.

I claim:

1. In a process for welding a vertical seam between upstanding elements, the steps comprising positioning a column of granular welding flux against said vertical seam to laterally cover a length of said vertical seam, supplying a welding electrode through the upper end of said flux column to said seam for fusion by the discharge of electric current from its end and deposition of weld metal in said seam, said electrode supplied sufficiently below the top end of said column to assure blanketing of said electric current discharge and said metal deposition by said flux, traversing the discharge end of said electrode upwardly in said seam, continuously supplying granular flux to the upper end of said column to elongate said column upwardly at a rate to substantially maintain a predetermined positional relation between the upper end of said column and the discharge end of said electrode, maintaining said column at substantially a predetermined length, and maintaining the flux in said column of substantially predetermined length substantially immobile relative to the portion of said seam covered thereby from the time said flux is added to said column to the time said flux is removed from said column.

2. In a process for welding a vertical seam between upstanding elements, the steps comprising positioning a column of granular welding flux against said vertical seam to laterally cover a length of said vertical seam, supplying a welding electrode through the upper end of said flux column to said seam for fusion by the discharge of electric current from its end and deposition of weld metal in said seam, said electrode supplied sufficiently below the top end of said column to assure blanketing of said electric current discharge and said metal deposition by said flux, traversing the discharge end of said electrode upwardly in said seam, continuously supplying granular flux to the upper end of said column to elongate said column upwardly at a rate to substantially maintain a predetermined positional relation between the upper end of said column and the discharge end of said electrode, maintaining said column at substantially a predetermined length, and maintaining the flux in said column of substantially predetermined length substantially immobile relative to the portion of said seam covered thereby from the time molten weld metal is deposited in said seam portion at least to the time said weld metal has solidified.

3. In a process for welding a vertical seam between upstanding elements, the steps comprising positioning a column of granular welding flux against said vertical seam to laterally cover a length of said vertical seam, supplying a welding electrode through the upper end of said flux column to said seam for fusion by the discharge of electric current from its end and deposition of weld metal in said seam, said electrode supplied sufficiently below the top end of said column to assure blanketing of said electric current discharge and said metal deposition by said flux, traversing the discharge end of said electrode upwardly in said seam, continuously supplying granular flux to the upper end of said column to elongate said column upwardly at a rate to substantially maintain a predetermined positional relation between the upper end of said column and the discharge end of said electrode, maintaining said column at substantially a predetermined length, and maintaining the flux in a continuous length of said column of substantially predetermined length substantially immobile relative to the portion of said seam covered thereby during the deposition and solidification of weld metal in said portion of said seam.

4. In a process for welding a vertical seam between upstanding elements, the steps comprising positioning a vertical, open ended trough against said vertical seam to laterally cover a length of said vertical seam, continuously supplying granular flux to the upper open end of said trough to fill said trough, supplying a welding electrode through the open upper end of said trough and beneath the flux therein to said seam for fusion by the discharge of electric current from its end and deposition of weld metal in said seam, traversing the discharge end of said electrode upwardly in said seam, raising said trough upwardly at a rate to substantially maintained a predetermined positional relation between the open upper end of said trough and said electrode discharge end, periodically providing a flux support barrier at the upper region of said trough and below said electrode discharge end to support the flux in said trough above said support and to prevent downward movement of said flux past said support, maintaining each support immobile relative to said seam at least until the weld metal adjacent the next higher platform has solidified, and periodically removing the bottom platform from said trough to maintain said column of flux in said trough at substantially a predetermined length.

5. In apparatus for electric arc welding vertical seams between upstanding elements, the combination comprising means defining a substantially vertical open ended trough positionable against the surfaces of upstanding elements and astraddle a vertical seam therebetween, means for progressing said trough defining means vertically along said seam while maintaining the portions of said trough defining means positioned against said surface immovable relative to said surface, means for introducing flux into the upper open end of said trough to fill said trough with flux, and means for closing the bottom of said trough, said closing means including a plurality of elements adapted to sequentially open to discharge flux from said trough to maintain the length of the flux column in said trough below a predetermined maximum length.

6. In apparatus for electric arc welding vertical seams between upstanding elements, the combination comprising means defining a substantially vertical open ended trough positionable against the surfaces of upstanding elements and astraddle a vertical seam therebetween, means for progressing said trough defining means vertically along said seam while maintaining the portions of said trough defining means positioned against said surface immovable relative to said surface, means for introducing flux into the upper open end of said trough to fill said trough with flux, and means for closing the bottom of said trough, said closing means including a plurality of elements adapted to sequentially move through said trough, said elements during the initial phase of said movement unobstructing vertical passage of flux through said trough, during the intermediate phase of said movement closing said trough to vertical passage of flux therethrough and during the final phase of said movement unobstructing the vertical passage of flux from said trough.

7. In apparatus for electric arc welding vertical seams between upstanding elements, the combination comprising means defining a substantially vertical open ended trough positionable against the surfaces of upstanding elements and astraddle a vertical seam therebetween, means for progressing said trough defining means vertically along said seam while maintaining the portions of said trough defining means positioned against said surface immovable relative to said surface, means for introducing flux into the upper open end of said trough to fill said trough with flux, and means for closing the bottom of said trough, said closing means including a plurality of opposed elements adapted to sequentially move through said trough, said opposed elements during the initial phase of said movement being separated to substantially unobstruct vertical passage of flux through said trough, during the intermediate phase of said movement said opposed elements engaging to close said trough to vertical passage of flux therethrough and during the final phase of said movement said opposed elements being again separated to open said trough to the vertical passage of flux from said trough.

8. In apparatus for electric arc welding vertical seams between upstanding elements, the combination comprising a plurality of abutting endless members arranged to define a vertical open ended trough, means for positioning the edges of the outer of said endless members defining the edges of said trough into engagement with the vertical surface of said upstanding elements and astraddle a vertical seam therein, means for progressing said endless members vertically along said seam while maintaining said edges in contact with and immovable relative to said surface, means for supplying flux to the upper end of said trough and closure means adapted to maintain a column of flux of predetermined length in said trough and immovable relative to said surface.

9. In apparatus for electric arc welding vertical seams between upstanding elements, the combination comprising a plurality of abutting endless members arranged to define a vertical open ended trough, means for positioning the edges of the outer of said endless members defining the edges of said trough into engagement with the vertical surface of said upstanding elements and astraddle a vertical seam therein, means for progressing said endless members vertically along said seam, pressure applying means affective on said endless members to maintain said edges of the outer of said endless members in contact with and immovable relative to said surface during said vertical progress of said endless members, means interconnecting said endless members for unisonal movement, means for supplying flux to the upper end of said trough, and closure means adapted to maintain a column of flux of predetermined length in said trough and immovable relative to said surface.

10. In apparatus for electric arc welding vertical seams between upstanding elements, the combination comprising a plurality of abutting endless members arranged to define a vertical open ended trough, means for positioning the edges of said endless members defining the edges of said trough into engagement with the vertical surface of said upstanding elements and astraddle a vertical seam therein, means for progressing said endless members vertically along said seam, pressure applying means affective on said endless members to maintain said edges of said endless members in contact with and immovable relative to said surface during said vertical progress of said endless members, means interconnecting said endless members for unisonal movement, means for supplying flux to the upper end of said trough, a series of spaced apart closure members carried by each of the outer endless members, the closure members of one series positioned oppositely to the closure members of the other series, and means bringing opposed closure members into engagement during their passage through the lower portion of said trough to maintain a column of flux of predetermined length in said trough and immovable relative to said surface.

11. In apparatus for electric arc welding vertical seams between upstanding elements, the combination comprising a plurality of abutting endless members arranged to define a vertical open ended trough, means for positioning the edges of the outer of said endless members defining the edges of said trough into engagement with the vertical surface of said upstanding elements and astraddle a vertical seam therein, means for progressing said endless members vertically along said seam, pressure applying means affective on said endless members to maintain said edges of the outer of said endless members in contact with and immovable relative to said surface during said vertical progress of said endless members, means interconnecting said endless members for unisonal movement, means for supplying flux to the upper end of said trough, a series of spaced apart closure members carried by each of said outer endless members, the closure members of one series positioned oppositely to the closure members of the other series, each of said closure members including an element movable from an open to a closed position, opposed pairs of closure members when in said trough and with their respective elements in closed position obstructing vertical movement of flux through said trough, means constantly urging said elements towards closed position, and means resisting the action of said urging means during the initial and the final phases of the movement of said closure members through said trough.

12. In apparatus for electric arc welding vertical seams between upstanding elements, the combination comprising a plurality of abutting endless members arranged to define a vertical open ended trough, means for positioning the edges of the outer of said endless members defining the edges of said trough into engagement with the vertical surface of said upstanding elements and astraddle a vertical seam therein, means for progressing said endless members vertically along said seam, pressure applying means affective on said endless members to maintain said edges of the outer of said endless members in contact with and immovable relative to said surface during said vertical progress of said endless members, means interconnecting said endless members for unisonal movement, means for supplying flux to the upper end of said trough, a series of spaced apart closure members carried by each of said outer endless members, the closure members of one series positioned oppositely to the closure members of the other series, each of said closure members including an element movable from an open to a closed position, opposed pairs of closure members when in said trough and with their respective elements in closed position obstructing vertical movement of flux through said trough, means constantly urging said elements towards closed position and guide ways adapted to engage the opposed closed pairs of closure members in the later phase of their movement through said trough and move said elements to the open position and to retain said elements in the open position until the end of the initial phase of their movement through said trough.

13. In apparatus for electric arc welding vertical seams between upstanding elements, the combination comprising a plurality of abutting endless members arranged to define a vertical open ended trough, means for positioning the edges of the outer of said endless members defining the edges of said trough into engagement with the vertical surface of said upstanding elements and astraddle a vertical seam therein, means for progressing said endless members vertically along said seam, pressure applying means effective on said endless members to maintain said edges of the outer of said endless members in contact with and immovable relative to said surface during said vertical progress of said endless members, means interconnecting said endless members for unisonal movement, means for supplying a consumable electrode into said trough for discharge of electric current from its end and deposition of weld metal in said seam, means for supplying flux to the upper end of said trough and above the locus of said electric current discharge to submerge said electric current discharge and the weld metal deposited, a series of spaced apart closure members carried by each of said outer endless members, the closure members of one series positioned oppositely to the closure members of the other series, each of said closure members including an element movable from an open to a closed position, opposed pairs of closure members when in said trough and with their respective elements in closed position obstructing vertical movement of flux through said trough, means constantly urging said elements towards closed position, and guide ways adapted to engage the opposed closed pairs of closure members after their movement through said trough to move said elements to the open position and to retain said elements in the open position until in the phase of their movement through said trough they have passed the locus of the electric current discharge and plastic deposited metal when they are released for movement to the closed position.

14. The welding apparatus as defined in claim 13, in which each of said guide ways extends around its respective endless member from the point of closure member engagement to the point of closure member release, each said guide-way spaced at a substantially uniform distance from its respective endless member from the point at which said closure members first attain the open position to said point of closure member release, and each said guideway member progressively reducing its spacing from the respective endless member from said point of closure member engagement to said point at which said closure member first attain open position.

15. In apparatus for electric arc welding vertical seams between upstanding elements, the combination comprising a frame member, means mounting said frame member for vertical movement along a vertical seam to be welded, a plurality of vertically disposed endless belts arranged to provide a vertical flux trough for said seam to be welded, a plurality of pairs of rollers carried by said frame member adapted to mount said endless belts, means for adjustably positioning said rollers relative to the upstanding member defining said vertical seam, and means for resiliently pressure loading said rollers in the direction of said seam.

16. In apparatus for electric arc welding vertical seams between upstanding members, the combination comprising a frame member, means mounting said frame member for vertical movement along a vertical seam to be welded, a plurality of vertically disposed endless belts arranged to provide a vertical flux trough for said vertical seam, a plurality of pairs of rollers carried by said frame member adapted to mount said endless belts, the upper rollers of said pairs of rollers being disposed at substantially the same level, gear means interconnecting said rollers for unisonal movement of said belts, means for adjustably positioning said rollers relative to the upstanding members defining the vertical seam, and means for resiliently pressure loading said rollers in the direction of the seam.

17. In apparatus for electric arc welding vertical seams between upstanding elements, the combination comprising a plurality of vertically disposed abutting endless belts defining a vertical open ended trough, means for positioning the edges of the outer of said endless belts defining the edges of said trough into engagement with the vertical surface of said upstanding elements and straddling a vertical seam therein, means for progressing said endless belts vertically along said seam, pressure applying means affective on said endless belts to maintain said edges of the outer of said endless belts in contact with and immovable relative to said surface during said vertical progress of said endless belts, means interconnecting said endless belts for unisonal movement, means for supplying flux to the upper end of said trough, closure means adapted to maintain a column of flux of predetermined length in said trough, and tamping means carried by at least one of said endless belts for compacting said column of flux.

References Cited in the file of this patent

UNITED STATES PATENTS

| | | |
|---|---|---|
| 2,395,723 | Chmielewski | Feb. 26, 1946 |
| 2,673,916 | Meyer | Mar. 30, 1954 |